Patented Aug. 21, 1934

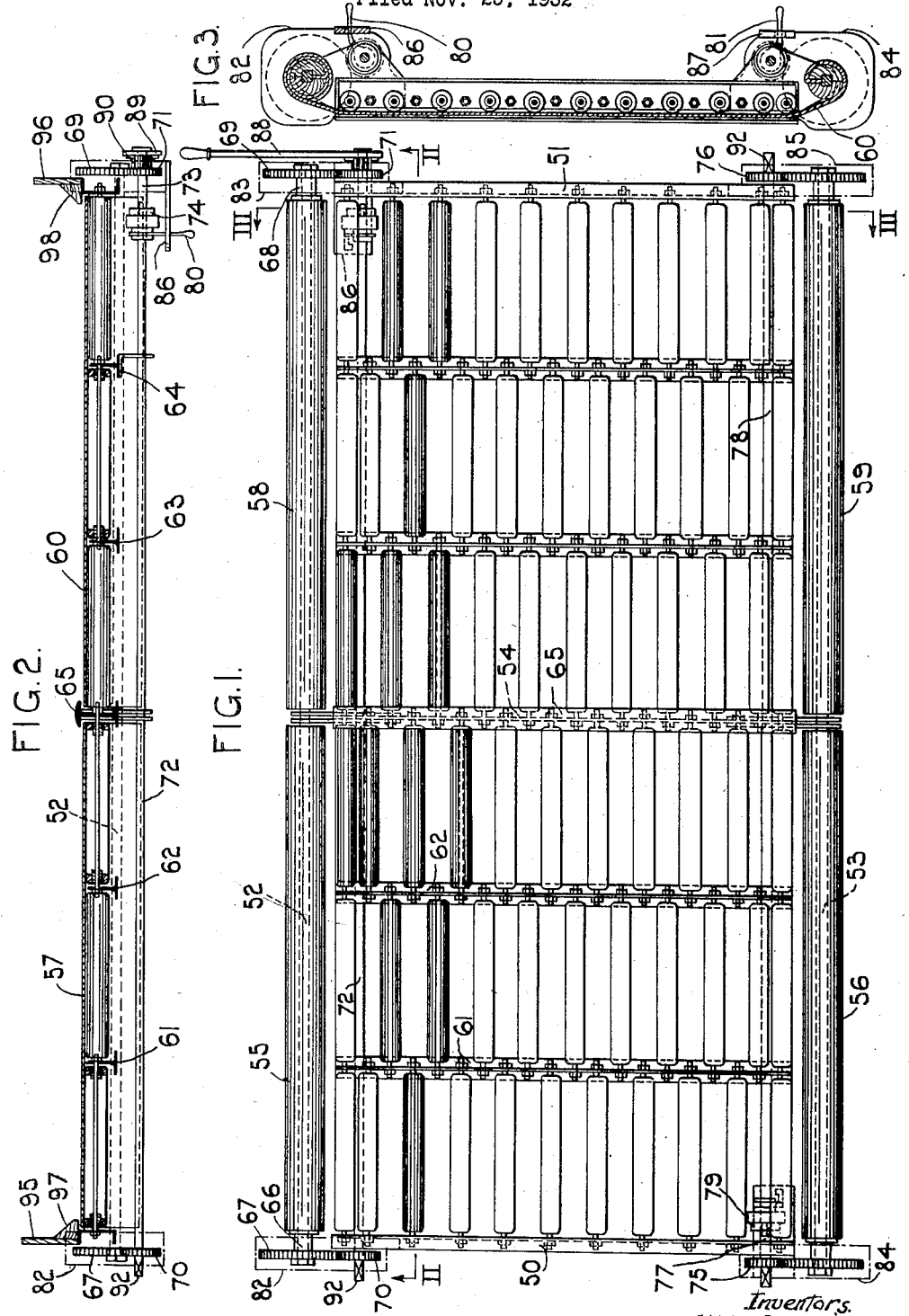

1,970,900

UNITED STATES PATENT OFFICE 1,970,900

MOVABLE FLOOR VEHICLE

Allan Everett Renwick, Cardiff, Wales, and Charles Solomon, Bath, England, assignors to Movable Floor (Vehicles) Limited, Cardiff, Wales Application November 25, 1932, Serial No. 644,378 In Great Britain December 28, 1931

5 Claims. (Cl. 214—83)

This invention relates to movable floor vehicles, such as motor lorries, rail trucks and the like, with more especial reference to those wherein a band of flexible material is mounted on drums or rollers by which movement of the floor is effected and is supported throughout its length by freely rotatable rollers.

Hitherto, movable floor vehicles have been arranged to discharge their contents at one end of the vehicle body, usually the rear end of the vehicle, as is the case with that described in the specification of Letters Patent No. 1,722,106, and it will be appreciated that occasions arise where it is desirable and sometimes necessary to discharge or dump the contents of the vehicle from the side thereof, for instance owing to the space available being inadequate to permit of the lorry being manoeuvred into a position with its tailboard over the discharge zone.

The general object of the present invention is to provide a vehicle construction whereby the contents of the vehicle can be discharged at places other than the rear end of the vehicle, and preferably whereby loading and discharging the contents may be effected from and to either side.

A further object is to provide a construction necessitating a minimum of operating effort to move the floor when loading or discharging.

In accordance with the invention, a movable floor vehicle comprises operating drums disposed longitudinally one on each side of the vehicle body mounting a flexible band constituting the floor which is supported throughout its length by freely rotatable rollers and which by means of such drums is movable transversely of the vehicle, whereby the contents of the vehicle can be discharged at will to either side thereof.

Such an arrangement is especially suitable where the invention is applied to railway trucks, enabling the loading or discharge thereof to be effected from and to platforms or vehicles at the side of the truck with a minimum of labour.

In the practice of the invention it has been found inexpedient commercially to produce satisfactory bands of a width exceeding 8 ft. and, therefore, in vehicles having a body space exceeding this dimension when adapted for side discharge a sectional floor or a floor comprising a plurality of bands will be employed.

Embodiments of the invention employing two or more flexible bands extending transversely across the vehicle over supporting rollers between operating drums at each side of the vehicle are provided with means for preventing damage to the juxtaposed edges of adjacent bands by the contents of the vehicle, such means conveniently comprising a partition rigidly mounted on the sub-frame of the floor or on the vehicle chassis and projecting upwardly between the juxtaposed edges of the adjacent bands to carry projecting lips overlying the respective edges and extending for the width of the floor, thereby removing any likelihood of heavy objects carried by the vehicle coming into contact with the edges of the bands constituting the floor and having a deleterious or damaging effect thereon.

The partition may be extended upwardly level with the end or side walls of the vehicle body, although preferably, a metal girder of T or H-section is employed secured to one of the intermediate frame members which serve to mount the freely rotatable rollers suporting the floor.

The operating drums mounting the flexible bands are conveniently divided up into sections in consonance with the floor sections and may be arranged for departmental loading and discharge, and the intermediate protecting strips will preferably extend over such drums with the object of preventing the access of any loose contents which may be carried by the vehicle such, for instance as sand, gravel, asphalt, and the like to the operating mechanism.

The supporting rollers may be in the form of metal tubes carried from rigid axles by ball races, the rigid axles being mounted in the floor sub-frame and desirably, in order that the rollers may be more accessible for repair, removal or replacement, the staggered roller construction described in co-pending application Serial No. 599,807 is employed.

The invention will be further described with reference to the accompanying explanatory drawing which illustrates by way of example an embodiment wherein the floor is divided into two sections arranged for independent or joint loading and discharge at either side of the vehicle, and in which,—

Fig. 1 is a plan view of a floor structure employing the staggered roller arrangement according to the aforementioned co-pending application, the flexible bands constituting the floor sections having been removed to more clearly show the disposition of the supporting rollers.

Fig. 2 is a longitudinal section on the line II—II of Fig. 1, and Fig. 3 is a transverse section on the line III—III of Fig. 1.

Referring now to the drawing, transverse end frames 50 and 51 of channel form are provided at each end of the floor and mount longitudinal shafts 52 and 53 carrying the winding drums and arranged at each side of the vehicle which may be a motor lorry, railway truck or the like, as mentioned hereafter.

In the majority of cases the longitudinal dimensions of the floor space will exceed 8 feet which is the maximum width of flexible band which can conveniently be manufactured, and accordingly the floor is longitudinally divided into two sections through the medium of a transverse frame member 54.

Preferably each floor section is individually operable so that it may be loaded or discharged separately, and accordingly winding drums or rollers mounted on the shafts 52 and 53 are provided, drums 55 and 56 being appropriated to the front floor section 57 and similar drums 58 and 59 to the rear floor section 60.

With reference more especially to the front section 57, it will be noted that between the forward transverse end frame 50 and the centre transverse member 54 two intermediate transverse supports 61 and 62 are arranged dividing the supporting rollers into three parallel rows with the rollers of adjacent rows staggered, the intermediate supports 61 and 62 being carried by rods mounting the aligned supporting rollers at each end of the row as in the previous embodiment, the front floor section thus comprising a complete operative unit.

Similarly, the supporting rollers of the rear section are divided into three staggered rows by two transverse supports 63 and 64 intermediate the central transverse frame member 54 and the rear frame member 51, while to protect the juxtaposed parallel edges of the two flexible bands 57 and 60, the central frame 54 is formed with a double horizontal flange 65 which projects over the edges of the bands 57 and 60, the central frame member 54 being conveniently of H-section for this purpose.

Any likelihood of heavy objects carried by the vehicle coming into contact with and causing damage to the edges of the bands 57 and 60 is thereby removed.

In order that the front and rear sections 57 and 60 of the floor may be operable independently, the winding drums 55, 58 and 56, 59 are not fixed to the shafts 52 and 53 respectively but are rotatable thereon, the drum 55 being connected through a sleeve 66 to a gear wheel 67 and the drum 58 being connected through a sleeve 68 to a gear wheel 69.

Enmeshed with the gear wheel 67 is a spur pinion 70 carried by an operating shaft 72 and enmeshed with the gear wheel 69 is a spur pinion 71 carried by an aligned extension 73, the shaft and its extension being coupled or uncoupled at will by a dog clutch 74.

The winding drums or rollers 56 and 59 on the near side of the floor are similarly connected to pinions 75 and 76 located at each end of a divided operating shaft, the portions 77 and 78 of which are adapted to be coupled or uncoupled by a dog clutch 79.

When it is desired to operate the floor sections independently, the dog clutches 74 and 79 are opened, control levers 80 and 81 being provided for the actuation of these clutches and supposing for example that the front floor section 57 is to be moved towards the offside, rotation of the operating pinion 70 enmeshed with the gear 67 will rotate the winding drum 55 so that the flexible band 57 constituting the front section of the floor will be wound thereon, thereby discharging the contents of the front floor section at the offside of the vehicle if unloading, or, alternatively, if the vehicle is being loaded, moving the contents of the floor loaded at the near side to their proper position.

Movement of the front section of the floor 57 towards the near side is effected by rotating the spur pinion 75 and corresponding movement of the rear floor section 60 towards the off or near side may be likewise effected by rotation of the spur pinions 71 or 76 as the case may be.

Simultaneous loading or discharging of both floor sections 57 and 60 may be effected when required by closing the dog clutches 74 and 79 by means of the levers 80 and 81, the former locking together the two sections 72 and 73 of the operating shaft for the drums 55 and 58 and the clutch 79 coupling together the two sections 77 and 78 of the operating shafts for the drums 56 and 59.

It will readily be appreciated that owing to the large reduction in contact area when moving the floor for side discharge according to the invention, considerably less frictional resistance is present between the contents of the floor and the end walls 95 and 96 of the vehicle than is the case with a longitudinally movable floor such as is illustrated in the aforementioned Patent No. 1,722,106 or co-pending application Serial No. 599,807, so that a high ratio reduction gear is unnecessary and a single reduction gear is usually suitable, a 2:1 reduction being shown in the illustrations between the operating pinions and the gears.

The various gears are shown housed in gear-boxes secured to the end frames 50 and 51, the off-side boxes 82 and 83 also mounting the shaft 52 and the near side boxes 84 and 85 mounting the shaft 53, and as shown clearly in the drawing the boxes 83 and 84 are equipped with flanges or plates 86 and 87 which provide guide slots for the levers 80 and 81 respectively.

For the convenient operation of the floor detachable operating handles such as 88, including one-way ratchets, may be supplied with the floor for fitment to any of the squared bosses 92 terminating the operating shafts 72, 73, 75 and 76, each operating handle having at one end a disc 89 forming a bearing for a ratchet wheel 90, the bore whereof is square to cooperate with the aforementioned squared bosses 92.

The disc 89 carries pawls urged by springs into engagement with the ratchet wheel 90, and it will be readily understood that when attached to any of the operating shafts, a simple to and fro motion of the handle 88 is transformed by the ratchet into uni-directional movement of the particular winding drums 55, 56, 58 or 59.

This method of operation is particularly convenient for railway trucks equipped with the movable floor, since the movement of the floor for loading or discharge may be effected by an operative standing between adjacent trucks, and while a two-section floor is shown, with longer trucks the floor may be divided into any desired number of sections each of which will approximately correspond with the length of the receptacles into which the contents are to be discharged.

Referring more especially to Fig. 2, it will be noted that for the purpose of protecting the edges of the flexible bands 57 and 60, the end walls 95 and 96 of the floor have projecting lips or corbels 97 and 98 which prevent the contents of the floor chafing or otherwise damaging the edges of the bands.

It will also be noted that the supporting rollers, in addition to being staggered according to the aforementioned co-pending application, have their ends reduced or inturned, for instance by a swaging or other appropriate process, thereby removing any possibility of the flexible band constituting the floor being damaged during its movement or when heavy weights are applied during loading.

Attention is also directed to the disposition of the winding drums below the level of the supporting rollers so that the floors are inclined downwardly at each side of the vehicle, discharge of the contents being thus greatly facilitated.

By the present invention an improved construction of movable floor suitable for fitment to motor lorries, railway trucks and like vehicles where facilities for discharge of the contents to either side are desirable is obtained, which can be cheaply manufactured and is convenient and foolproof in use.

What we claim is:—

1. A movable floor for vehicles comprising a frame, transverse members to said frame, operating drums disposed longitudinally at each side of the frame, a plurality of juxtaposed flexible bands mounted on said drums and constituting the entire floor of the vehicle, axles secured to said members, rollers mounted on said axles supporting each of said bands between the drums and arranged in rows with their axes parallel to the axes of said drums, the ends of adjacent roller axles of juxtaposed bands overlapping and being secured in alternate relation in a common transverse member of the frame.

2. A movable floor for vehicles comprising a frame, transverse members to said frame operating drums disposed longitudinally at each side of said frame, a plurality of juxtaposed independent flexible bands constituting the entire floor mounted on said drums, intermediate freely rotatable rollers carried by said transverse frame members supporting said flexible bands throughout their length and stationary rigid protecting means overlying the juxtaposed edges of said bands and preventing damage thereto.

3. A movable floor for vehicles, comprising a frame, front, central and rear transverse members to said frame, pairs of operating drums disposed longitudinally at each side of said frame between said front and central, and central and rear transverse members, flexible bands mounted transversely of the vehicle on each pair of said drums, rows of axles secured to said members and rollers mounted on said axles supporting each band between the drums, the rollers of adjacent rows being staggered and the ends of adjacent rollers of juxtaposed bands overlapping and being secured in alternate relation in a common transverse member of the frame.

4. A movable floor for vehicles comprising a frame, duplicate aligned operating drums disposed longitudinally at each side of said frame, juxtaposed independent flexible bands extending transversely mounted one on each pair of drums, two series of intermediate freely rotatable rollers carried by the frame supporting said flexible bands each series comprising three parallel rows, the rollers of adjacent rows being staggered throughout both series, the juxtaposed ends of the rollers of adjacent rows being carried by common frame members, and operating means associated with each drum for moving its floor section transversely to discharge the contents of the section.

5. A movable floor for vehicles comprising a frame having front, central and rear transverse girders, a pair of operating drums disposed longitudinally at each side of said frame between said front and central girders, a second pair of aligned operating drums between said central and rear girders, juxtaposed independent flexible bands constituting the floor associated with each pair of drums, intermediate freely rotatable rollers carried by the frame supporting said bands, said central girder being of H-section having projecting lips overlying the juxtaposed marginal edges of said bands.

ALLAN E. RENWICK.
CHARLES SOLOMON.